(12) United States Patent
Morneau et al.

(10) Patent No.: US 8,452,989 B1
(45) Date of Patent: May 28, 2013

(54) PROVIDING SECURITY TO AN ELECTRONIC DEVICE

(75) Inventors: Todd Morneau, Sudbury, MA (US); William Duane, Westford, MA (US)

(73) Assignee: EMC Corporation, Hopkinton, MA (US)

( * ) Notice: Subject to any disclaimer, the term of this patent is extended or adjusted under 35 U.S.C. 154(b) by 722 days.

(21) Appl. No.: 12/634,116

(22) Filed: Dec. 9, 2009

(51) Int. Cl.
*G06F 21/00* (2006.01)

(52) U.S. Cl.
USPC ........... 713/193; 361/764; 361/767; 361/782; 361/783; 361/784; 257/678; 257/686; 257/777; 365/63

(58) Field of Classification Search
USPC ........................................................ 713/193
See application file for complete search history.

(56) References Cited

U.S. PATENT DOCUMENTS

| | | | |
|---|---|---|---|
| 4,914,732 A * | 4/1990 | Henderson et al. | 340/3.71 |
| 5,361,062 A | 11/1994 | Weiss et al. | |
| 5,485,519 A | 1/1996 | Weiss | |
| 5,805,711 A * | 9/1998 | Windel et al. | 380/55 |
| 5,998,858 A * | 12/1999 | Little et al. | 257/678 |
| 6,587,843 B1 * | 7/2003 | Gelfer et al. | 705/60 |
| 7,054,162 B2 * | 5/2006 | Benson et al. | 361/760 |
| 7,489,993 B2 * | 2/2009 | Coffee et al. | 701/32.3 |
| 7,592,829 B2 * | 9/2009 | Walmsley et al. | 326/8 |
| 7,597,250 B2 | 10/2009 | Finn | |
| 7,638,866 B1 * | 12/2009 | Bean et al. | 257/686 |
| 7,675,151 B1 * | 3/2010 | Boone | 257/686 |
| 7,707,428 B2 * | 4/2010 | Poth et al. | 713/184 |
| 7,747,887 B2 * | 6/2010 | Shipton et al. | 713/340 |
| 7,861,312 B2 * | 12/2010 | Lee et al. | 726/27 |
| 7,986,158 B2 * | 7/2011 | Langton | 326/8 |
| 8,068,612 B2 | 11/2011 | Appenzeller et al. | |
| 8,171,531 B2 | 5/2012 | Buer | |
| 2006/0087883 A1 * | 4/2006 | Ozguz et al. | 365/185.04 |

OTHER PUBLICATIONS

Decker, Michael. A Security Model for Mobile Processes. 7th International Conference on Mobile Business. Pub. Date: 2008. Relevant pp. 211-220. Found on the World Wide Web at: http://ieeexplore.ieee.org/stamp/stamp.jsp?tp=&arnumber=4570180.*

* cited by examiner

*Primary Examiner* — Nathan Flynn
*Assistant Examiner* — Jeremiah Avery
(74) *Attorney, Agent, or Firm* — BainwoodHuang

(57) ABSTRACT

A technique provides security to an electronic device. The technique involves disposing a microprocessor between a printed circuit board and a circuit element to restrict physical access to the microprocessor, the microprocessor having (i) a bottom which faces the printed circuit board in a first direction and (ii) a top which faces the circuit element in a second direction which is opposite the first direction. The technique further involves delivering power to the microprocessor from a power source while the microprocessor is disposed between the printed circuit board and the circuit element, the microprocessor performing electronic operations in response to the power delivered from the power source. The technique further involves electronically altering or preventing the microprocessor from further performing the electronic operations in response to tampering activity on the circuit element. Such detection of the tampering activity may involve monitoring a covert signal for tamper evidence detection.

19 Claims, 8 Drawing Sheets

PROVIDING SECURITY TO AN ELECTRONIC DEVICE

BACKGROUND

A conventional authentication token is a portable electronic device which creates one-time passcodes (OTPs) for use in authenticating a user to an authentication entity. Within the authentication token, a programmed microprocessor derives an OTP from a secret (e.g., a seed or an encryption key), and visually outputs the OTP on a display to the user.

Authentication tokens can be based on a variety of underlying mechanisms. Some examples include those which are based on time, others are based on counters or events, and so on.

To demonstrate to the authentication entity that the user currently possesses a particular time-based authentication token, the user must provide the currently displayed OTP to the authentication entity by a certain time. After that time passes, the authentication entity considers that OTP to have become stale, and no longer accepts that OTP as proper authentication of the user.

An authentication token provider may take steps to stop a hacker from duplicating the authentication token operation. One previously-used approach involves the provider (i) positioning the display over the microprocessor and (ii) tightly gluing the internal circuitry of the authentication token (i.e., the microprocessor, the display, the printed circuit board, the battery, etc.) within the authentication token housing to block physical access to the microprocessor. Another previously-used approach involves spring loading the battery of the authentication token within the authentication token housing so that, if the hacker successfully opens the housing, the spring automatically disconnects the battery from the microprocessor causing the microprocessor to lose its memory.

SUMMARY

Improved security techniques involve positioning a microprocessor of an electronic device (e.g., an authentication token) between a printed circuit board and a circuit element, and electronically preventing the microprocessor from further performing electronic operations in response to tampering activity on the circuit element. For example, under normal conditions, the circuit element may provide a particular signal or circuit response which is typically expected by the microprocessor. However, if a hacker tampers with the circuit element (e.g., cuts a pin or removes the circuit element) resulting in a change in the signal or response, the microprocessor responds in a secure manner by altering or no longer performing the electronic operations. In some arrangements, the microprocessor stops performing electronic operations altogether. In other arrangements, the microprocessor is prevented from performing standard operations (e.g., electronic operations which authenticate a user under normal conditions), and begins performing specialized operations that covertly signals a receiving device (e.g., an authentication entity) that a tampering activity has occurred.

One embodiment is directed to a method of providing security to an electronic device. The method includes disposing a microprocessor between a printed circuit board and a circuit element to restrict physical access to the microprocessor, the microprocessor having (i) a bottom which faces the printed circuit board in a first direction and (ii) a top which faces the circuit element in a second direction which is opposite the first direction. The method further includes delivering power to the microprocessor from a power source while the microprocessor is disposed between the printed circuit board and the circuit element, the microprocessor performing particular electronic operations in response to the power delivered from the power source. The method further includes electronically altering or preventing the microprocessor from further performing the particular electronic operations in response to tampering activity on the circuit element. Detection of the tampering activity may involve monitoring a covert signal for effective tamper evidence detection.

Another embodiment is directed to an electronic device including a printed circuit board, a circuit board element, and a microprocessor disposed between the printed circuit board and the circuit element to restrict physical access to the microprocessor. The microprocessor has (i) a bottom which faces the printed circuit board in a first direction, and (ii) a top which faces the circuit element in a second direction which is opposite the first direction. The microprocessor (i) performs particular electronic operations in response to power from a power source while the microprocessor is disposed between the printed circuit board and the circuit element, and (ii) is prevented from further performing the particular electronic operations in response to tampering activity on the circuit element.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views. The drawings are not necessarily to scale, emphasis instead being placed upon illustrating the principles of various embodiments of the invention.

DETAILED DESCRIPTION

An improved security technique involves positioning a microprocessor of an electronic device between a printed circuit board and a circuit element, and electronically preventing the microprocessor from further performing electronic operations in response to tampering activity on the circuit element. For example, the circuit element may provide a particular signal or circuit response which is expected by the microprocessor in the absence of any tamper activity on the circuit element. If a hacker does tamper with the circuit element (e.g., cuts or removes the circuit element) resulting in a change in the signal or in the response, the microprocessor no longer performs the electronic operations.

In some arrangements, the microprocessor stops performing electronic operations entirely. That is, in response to the tampering activity, the microprocessor may dispose of critical information and then deactivate itself.

In other arrangements, the microprocessor stops performing standard operations, and begins performing different operations that are detectable by a receiving device but that are unnoticeable to the user. For example, in the context of an authentication token, the standard operations may include providing proper one-time passcodes (OTPs) to a user to enable proper authentication with an authentication server (or other authenticating entity). In contrast, the different operations performed after the tampering activity occurs may provide what appear to be proper OTPs, but which are actually special OTPs that informs the authentication server of the occurrence of the tampering event thus indicating that security may have become compromised. Such non-standard operation provides the authentication server with an opportunity to take remedial action (e.g., prevent authentication and notify the true owner of the authentication token, attempt to collect further information such as location or network information in order to possibly identify or catch the hacker, etc.).

Figure 1:
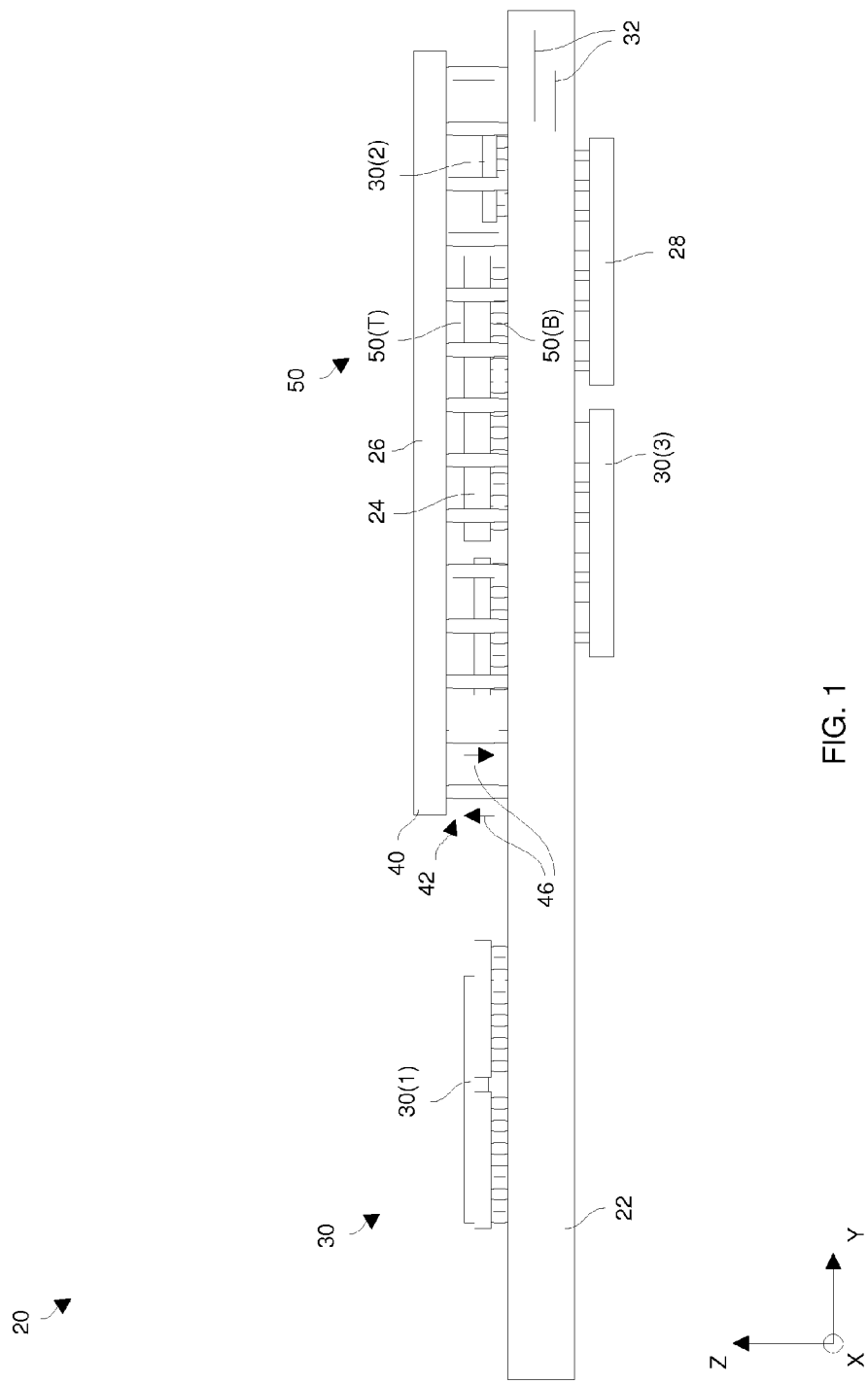
FIG. 1 is a side view of an electronic device which prevents a microprocessor from further performing electronic operations in response to tampering activity on a circuit element.
Figure 2:
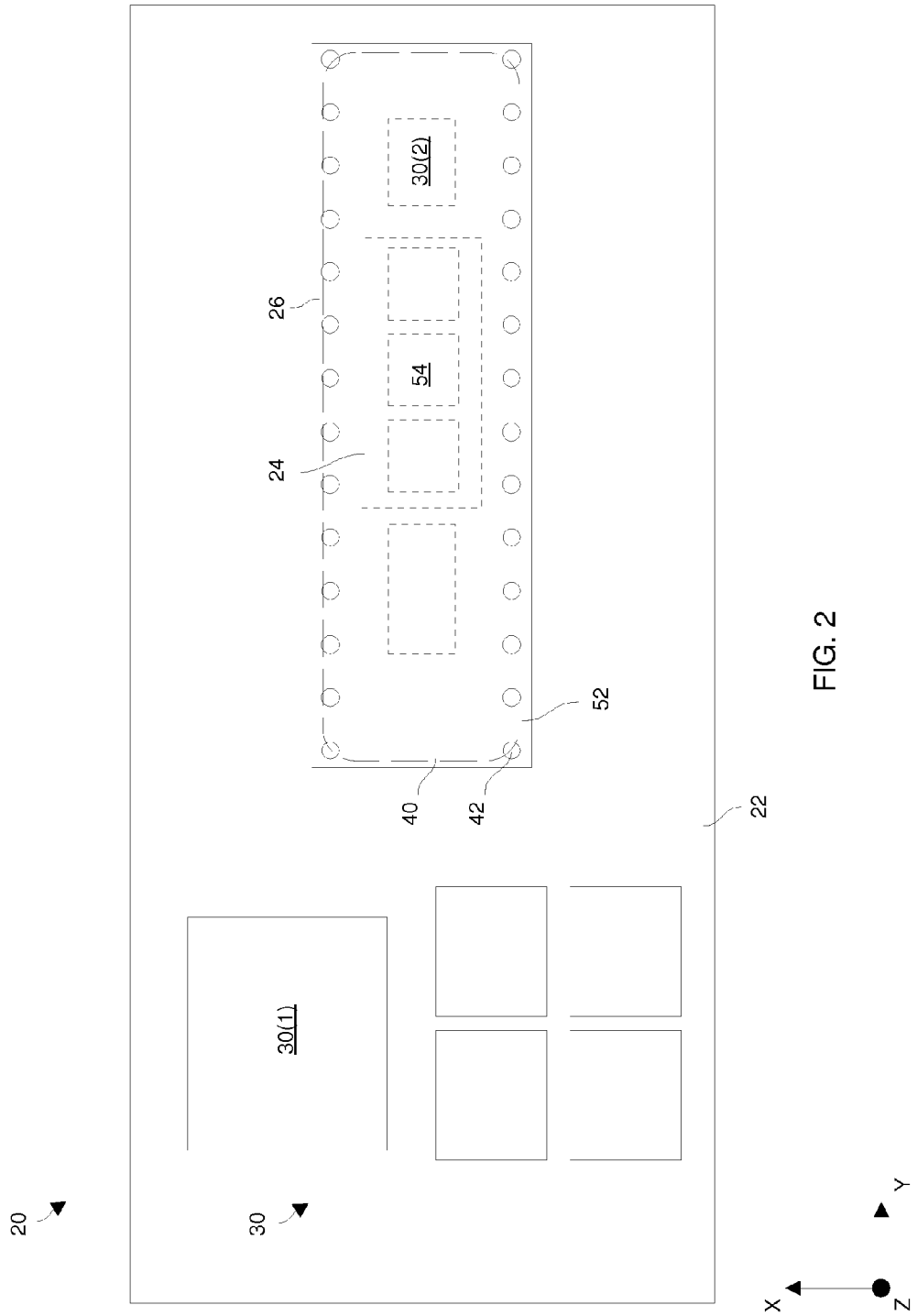
FIG. 2 is a top view of the electronic device of FIG. 1.

FIGS. 1 and 2 illustrate an electronic device 20 which prevents a microprocessor from further performing particular electronic operations in response to tampering activity on a circuit element. FIG. 1 is a side view of the electronic device 20. FIG. 2 is a top view of the electronic device 20.

As shown in FIGS. 1 and 2, the electronic device 20 includes a printed circuit board (PCB) 22, a microprocessor 24, an electronic display 26, a power source 28 (e.g., a battery). The microprocessor 24, the electronic display 26, and the power source 28 are mounted to the PCB 22 using standard PCB mounting techniques (e.g., surface mount soldering techniques, pin-in-hole soldering techniques, compression fit, connectors, combinations thereof, etc.). The electronic device 20 is further capable of including other components 30 (e.g., a clock, counters, buffers, connectors, discrete components, etc.) which are illustrated as components 30(1), 30(2), 30(3), . . . , and so on. Furthermore, the PCB 22 may include multiple conductive layers 32 (e.g., signal layers, power supply layers, ground reference layers, etc.) to properly connect the various circuit elements together.

The electronic display 26 includes a display portion 40 and a set of pins 42. The display portion 40 is constructed and arranged to output visual data (e.g., OTPs) to a user based on signals 46 from the microprocessor 24 and/or the other circuit elements 30 on the PCB 22 (see FIG. 1). The set of pins 42 conveys the signals 46 to and from the display portion 40. Examples of a suitable electronic display 26 include a liquid crystal display (i.e., a row of LCD elements), a light-emitting diode display, a graphical display panel, etc.

It should be understood that the term "set of pins" 42 is used to generally identify any type of conducting interface which electrically connects the display portion 40 of the electronic display 26 to the PCB 20. Another operation performed by the set of pins 42 is to mechanically support the display portion 40 in a fixed position relative to the PCB 22 and the microprocessor 24. Examples of such pins include soldering pins, compression fit pines, metallic posts or standoffs, connector terminals, and similar types of component leads/contacts.

As best seen in FIG. 1, the microprocessor 24 has a set of obstructed surfaces 50. In particular, the microprocessor has a bottom 50(B) which faces the PCB 22 in a first direction (i.e., the negative Z-direction), and a top 50(T) which faces the electronic display 26 in a second direction (i.e., the positive Z-direction) which is opposite the first direction. Accordingly, the microprocessor 24 is disposed between the PCB 22 and electronic display 26 in a manner that restricts physical access to the microprocessor 24. Moreover, the set of pins 42 preferably extends around a periphery 52 of the display portion 40 (see FIG. 2), and from the periphery 52 to the PCB 22 thus further concealing/obstructing the microprocessor 24. As a result, critical portions 54 of the microprocessor 24 (e.g., an electronic interface) are difficult or even impossible to reach (e.g., electronically probe) without significantly tampering with the electronic device 20 (e.g., without cutting one or more pins 42 or puncturing the display portion 40 of the electronic display 26).

It should be understood that other circuit board elements can be strategically positioned on the PCB 22 to improve security as well. For example, in contrast to the component 30(1) which resides on an exposed location of the PCB 22, the component 30(2) is disposed between the electronic display 26 and the PCB 22 and thus enjoys protection similar to that of the microprocessor 24 (see FIG. 1). Moreover, due to the close adjacency of the microprocessor 24 and the component 30(2), these components further conceal each other from physical access.

Similarly, the component 30(3) and the power source 28 obstruct the opposite side of the PCB 22 thus providing additional obstruction to the microprocessor 24. In particular, if any plated through holes (PTHs) or vias extend through the PCB, these opposite-side mounted components hinder access to these PTHs/vias.

By way of example, the electronic device 20 is constructed and arranged to operate as an authentication token. Along these lines, the microprocessor 24 is programmed to perform particular electronic operations which periodically output standard OTPs which enable a user to properly authenticate with an authentication server (e.g., a new OTP every minute or every 30 seconds).

Upon detection of a tampering activity such as disconnection of the electronic display 26 from the PCB 22, the microprocessor 24 no longer performs the electronic operations. In some arrangements, the microprocessor 24 stops operating altogether. In other arrangements, the microprocessor 24 stops performing the particular electronic operations which periodically output standard OTPs, and begins performing different operations that output non-standard OTPs which are detectable by the authentication server but unnoticeable to the user. Further details will now be provided with reference to FIGS. 3 through 6.

FIGS. 3 through 6 schematically illustrate a variety of alternative connecting schemes for connecting the microprocessor 24 and the electronic display 26. As shown in each of FIGS. 3 through 6, the microprocessor 24 includes an I/O interface 60, processing circuitry 62, and memory 64. It should be understood that some portions of the conductive paths shown in FIGS. 3 through 6 are formed in part by conductors of the PCB 22. In the context of an authentication token, the memory 64 stores a secret 70 (e.g., a seed, an encryption key, and/or other cryptographic information, etc.), executable code 72 and other information 74 (e.g., operating parameters, collected data, etc.).

The I/O interface 60 provides external access to the processing circuitry 62 and the memory 64 of the microprocessor 64. The processing circuitry 62 executes the code 72 to perform various operations. For example, in the context of an authentication token, the processing circuitry 62 executes the code 72 to derive proper OTPs based on the secret 70, and outputs those OTPs through the I/O interface 60 for rendering on the electronic display 26. Additionally, the processing circuitry 64 can save and update additional information 74 within the memory 64 (e.g., control status information, collected runtime data, etc.).

It should be understood that additional memory for storing the executable code, the other information, etc. can reside outside the microprocessor 24 (e.g., see the other components 30 in FIGS. 1 and 2). The processing circuitry 62 of the microprocessor 24 can access this external memory and other components of the electronic device 20 through the I/O interface 60.

Figure 3:
FIG. 3 is a block diagram of a first version of the electronic device of FIG. 1.

In the connection scheme of FIG. 3, the microprocessor 24 further includes an input 80 (e.g., an enable/disable pin, a general purpose I/O pin, etc.) which connects to a positive voltage node V+ through a particular pin 42(V+) of the electronic display 26. Along these lines, the electronic display 26 may include, as the particular pin 42(V+), one of the set of pins 42 that is otherwise unused in connection with visually displaying data to the user or a dedicated pin 42 that is part of the electronic display 26 simply for support purposes. The positive voltage node V+ may be made available from the power source 28 through the PCB 22 and perhaps a set of voltage dividing resistors.

During operation, the input 80 of the microprocessor 24 receives a voltage signal V+ through the pin 42(V+) of the electronic display 26 while the pin 42(V+) remains intact and the electronic display 26 remains connected to the PCB 22. Preferably, the voltage signal V+ is purposefully set so that it exceeds a predetermined voltage threshold (e.g., 0.5 Volts, 1.0 Volts, 1.2 Volts, 1.5 Volts, 3.0 Volts, 5 Volts, etc.) as long as the pin 42(V+) remains intact and the electronic display 26 remains connected to the PCB 22. In this situation, the microprocessor 24 does not consider any tampering activity to have occurred and thus continues to perform the particular electronic operations in a normal manner (e.g., the microprocessor 24 continues to generate proper OTPs).

However, if the electronic display 26 is disconnected from the PCB 22 or the pin 42(V+) is cut, the input 80 of the microprocessor 24 no longer receives the voltage signal V+ due to discontinuity between the input 80 and the positive voltage node V+, and the voltage on the input 80 is pulled low, e.g., is pulled to 0 Volts, by the ground reference 82. Once the input 80 senses that the voltage drops below the predetermined voltage threshold, the microprocessor 24 considers a tampering activity to have occurred and stops performing electronic operations in the normal manner.

In some arrangements, the microprocessor 24 stops all activity in response to the detected tampering activity even though the microprocessor 24 continues to have access to power from the power source 28. In particular, based on the code 72, the microprocessor 24 deletes the secret 70 and perhaps some of the other information 74 in the memory 64. Optionally, the microprocessor 24 further erases other information that is external to the microprocessor 24. Such information may be stored in external volatile memory, e.g., the microprocessor 24 can simply turn off a switch which controls power to the microprocessor 24 and external volatile memory. If critical information is stored in a non-volatile manner (e.g., in flash memory or in an EPROM), the microprocessor 24 can send erase commands to the external non-volatile memory to erase the information before deactivating/terminating operation.

In other arrangements, the microprocessor 24 continues to operate in a prolonged manner in response to the detected tampering activity. In particular, based on the code 72, the microprocessor 24 stops performing its normal electronic operations and begins performing specialized operations. In the context of an authentication token, the microprocessor 24 outputs special OTPs which appear to the token holder as normal OTPs. That is, the normal OTPs and the special OTPs may be visually indistinguishable but detectable by an authentication entity.

Along these lines, the normal OTPs may exhibit a first expected behavior and the special OTPs may exhibit a second expected behavior that is different than the first expected behavior. In particular, the special OTPs may include a hidden notification, message or flag so that, when an authentication server receives this notice, the authentication server takes some form of remedial action. One particular way to change behavior is to separate an OTP into a first half and a second half, and then control the display order of the first and second halves in order to covertly communicate additional information such as whether a tampering activity has been detected by the electronic device 20. Another way to covertly communicate the tampering is to alter the cryptographic operation which creates the OTPs in such a way that the authentication server can detect the modified cryptographic operation. Other ways include secretively embedding extra data within OTPs, replacing portions of OTPs with extra data, purposefully introducing certain bit errors into the OTPs, and so on.

For example, suppose that a hacker tries to log into a Website user account using a Web browser after the microprocessor 24 has detected the tampering activity. Upon receipt of the special OTP which indicates that security of the electronic device 20 has been compromised, the authentication server can indicate via the Website that technical difficulties have been encountered (rather than allow the hacker access to the user account) and simultaneously send an out-of-band notification to the user of record indicating that the electronic device 24 requires replacement (and perhaps a replacement authentication token). In such a situation, the authentication server may be able to acquire extra information from the hacker such as location information or additional identifying data that could assist tracking down the hacker.

As the microprocessor 24 clandestinely informs the authentication server of the tampering activity, the microprocessor 24 may output additional information from memory in a manner that is undetected by the current authentication token holder. For example, in the manner as explained above for communicating occurrence of a tampering activity, the electronic device 20 can output particular types of additional information to the authentication server such as the current level of remaining battery power, current temperature, any encountered faults/failures, and so on. In some situations, the memory 64 holds a small database of selectable items of data/status to return back to the authentication server (e.g., see the other information 74 in FIG. 3). Further details will now be provided with reference to FIG. 4.

Figure 4:
FIG. 4 is a block diagram of a second version of the electronic device of FIG. 1.

In the connection scheme of FIG. 4, the microprocessor 24 has an input 80 which connects to the ground reference 82 through a particular pin 42(GND) of the electronic display 26. In a manner similar to that discussed above in connection with FIG. 3, the electronic display 26 may include, as the particular pin 42(GND), one of the set of pins 42 that is otherwise unused in connection with visually displaying data to the user or a dedicated pin 42 that is part of the electronic display 26 simply for support purposes.

During operation, the input 80 of the microprocessor 24 receives a ground reference signal (e.g., substantially 0 volts) through the pin 42(GND) while the pin 42(GND) remains intact and the electronic display 26 remains connected to the PCB 22. In particular, the microprocessor 24 may compare the voltage on the input 80 to a predetermined voltage threshold such as 1.0 Volts, 1.1 Volts, 1.5 Volts, etc. and continue to perform electronic operations (e.g., to generate proper OTPs) as long as the pin 42(GND) remains intact and the electronic display 26 remains connected to the PCB 22, i.e., as long as the voltage on the input 80 is less than the predetermined voltage threshold. In this situation, the microprocessor 24 does not consider any tampering activity to have occurred.

However, if the electronic display 26 is disconnected from the PCB 22 or the pin 42(GND) is cut, the input 80 of the microprocessor 24 no longer receives the ground reference signal and begins to receive a voltage signal V+ which is higher than the predetermined voltage threshold, e.g., the input 80 is pulled high to V+.

Once the input 80 senses that the voltage exceeds the predetermined voltage threshold due to disconnection with the ground reference, the microprocessor 24 considers a tampering activity to have occurred and stops performing the electronic operations as described above. In particular, the microprocessor 24 stops operating entirely, or operates in a different manner (since the microprocessor 24 continues to have access to the power source 28). Further details will now be provided with reference to FIG. 5.

Figure 5:
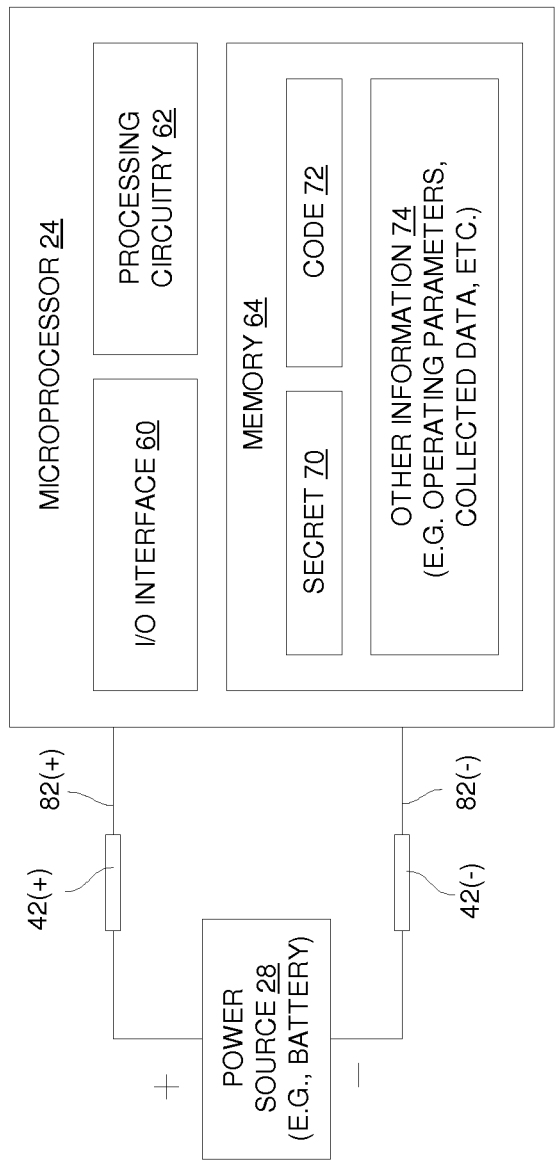
FIG. 5 is a block diagram of a third version of the electronic device of FIG. 1.

In the connection scheme of FIG. 5, the microprocessor 24 has power supply terminals 80(+), 80(−) which connect to the power source 28 through pins 42(+),42(−) of the electronic display 26. These pins 42(+),42(−) may be dedicated to providing continuity between the power supply terminals 80(+), 80(−) of the microprocessor 24 and the power source 28, or perhaps be the power supply terminals of the electronic display 26 themselves.

During operation, the microprocessor 24 continues to receive power from the power source 28 as long as the electronic display 26 remains connected to the PCB 22 and the pins 42(+),42(−) remain intact. During this time, the microprocessor 24 continues to perform the electronic operations.

However, if the electronic display 26 is disconnected from the PCB 22 or one of the pins 42(+),42(−) is cut, the microprocessor 24 loses power and stops operating. In this situation, the contents of the memory 64 (e.g., the secret 70, the code 72 and the other information 74) are lost as soon as the microprocessor 24 loses power since the volatile memory 64 requires power to sustain the contents of the memory 64. Accordingly, a breach of security due to such tampering is prevented.

It should be understood that, in an alternative arrangement, only one pin 42 of the electronic display 26 connects the microprocessor 24 to the power source 28. In this arrangement, the return path does not include any pins 42 of the electronic display 26 (e.g., the microprocessor 24 connects directly to the power source 28 through a common ground). Further details will now be provided with reference to FIG. 6.

Figure 6:
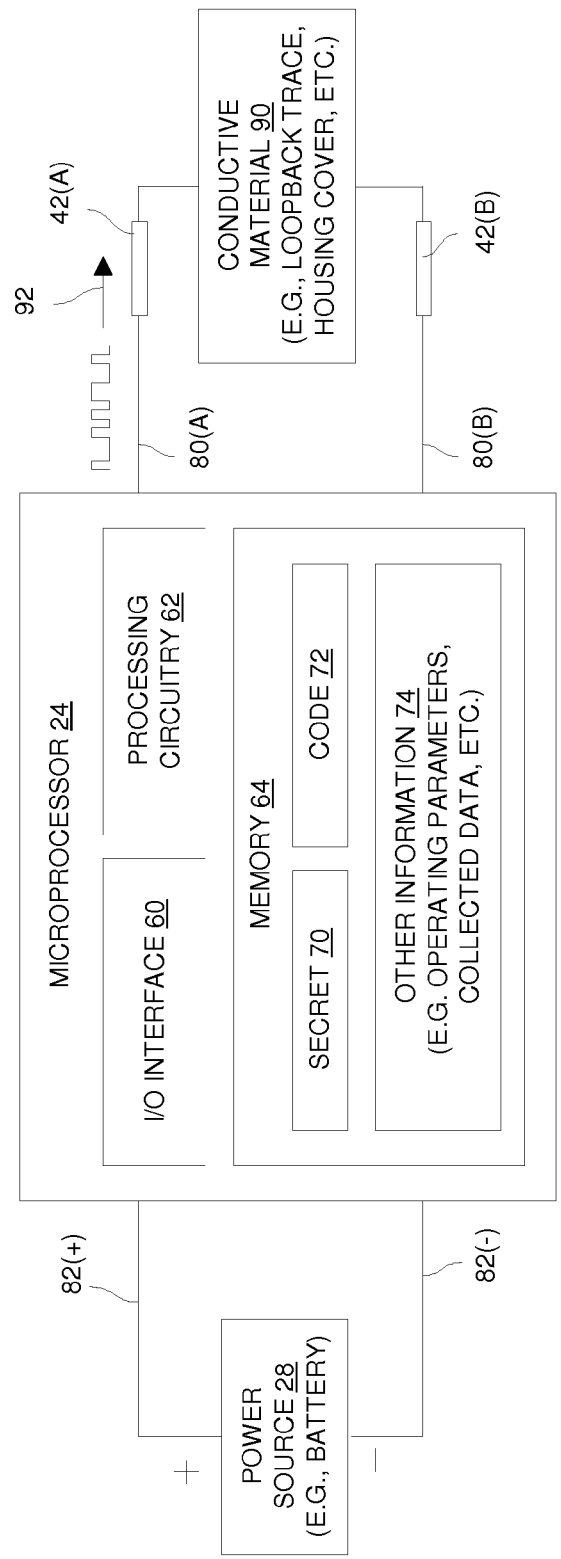
FIG. 6 is a block diagram of a fourth version of the electronic device of FIG. 1.

In the connection scheme of FIG. 6, the microprocessor 24 further includes an output 80(A) and an input 80(B) which connect to pins 42(A), 42(B) of the electronic device respectively. For example, the microprocessor 24 may have general purpose I/O pins available for use as the pins 80(A), 80(B).

As further shown in FIG. 6, conductive material 90 connects the pins 42(A), 42(B) thus forming a conductive loop between the output 80(A) and an input 80(B) of the microprocessor 24. In some arrangements, the conductive material 90 forms part of the electronic display 26. In other arrangements, the conductive material 90 (and perhaps even the pins 42(A), 42(B)) is external to the electronic display 26 (e.g., an inner metallic coating or conductive member supported by part of the housing).

During operation, the output 80(A) of the microprocessor 24 outputs an electronic signal 92 and the microprocessor 24 checks whether the electronic signal 92 returns on the input 80(B). The electronic signal 92 may be a particular constant voltage. Alternatively, the electronic signal 92 may be a stream of varying voltage values (e.g., bits) to make it more difficult for a hacker to identify the various participating elements as part of a tamper detection mechanism (e.g., the varying signal 92 can appear to the holder as if it is simply used to in conjunction with other varying signals to properly output data on the electronic display 26). If the microprocessor 24 successfully receives the electronic signal 92 on the input 80(B), the microprocessor 24 considers the electronic device 20 to be intact.

However, if the microprocessor 24 fails to receive the electronic signal 92 correctly, a discontinuity has occurred along the conductive loop formed by the pins 40(A), 40(B) and the conductive material 90. In this situation, the microprocessor 24 considered a tampering activity to have occurred and takes remedial action as explained above in connection with the other configurations of FIGS. 3 through 5. Such remedial action may include erasing the secret 70 in the memory 64, deactivating, or continuing to output OTPs in an attempt to notify an authentication server of the tampering activity. Further details will now be provided with reference to FIG. 7.

Figure 7:
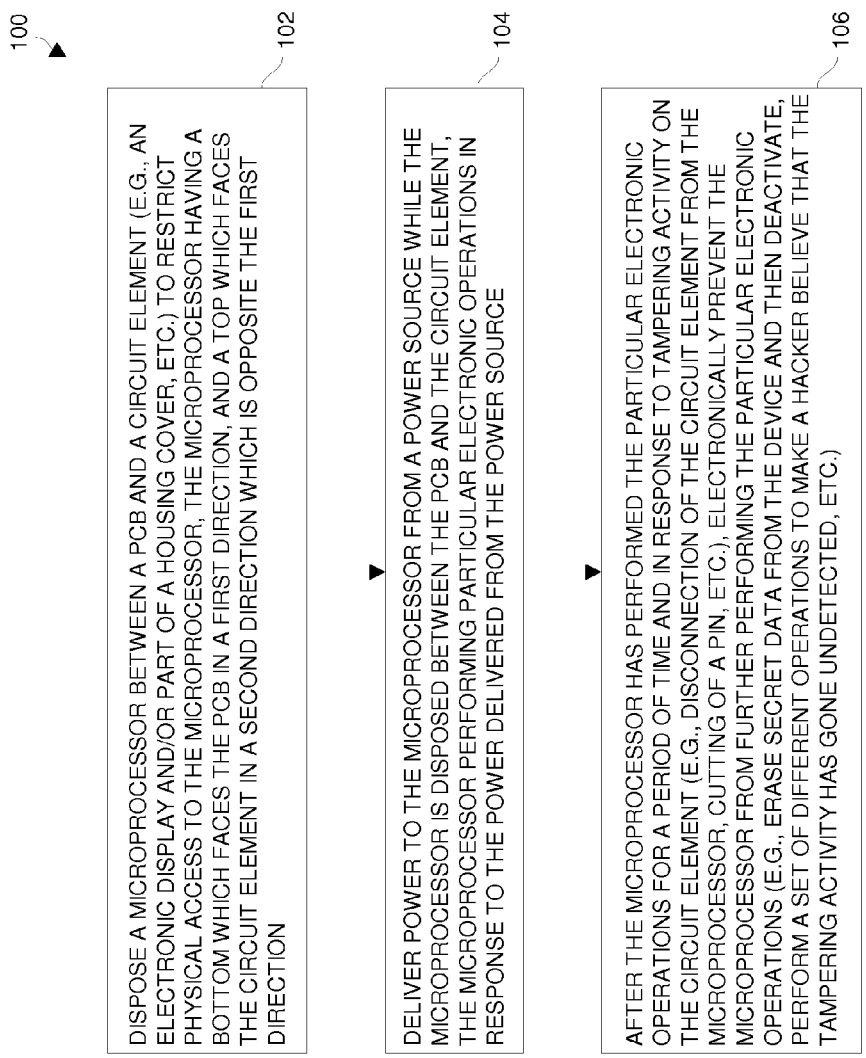
FIG. 7 is a flowchart of a procedure which provides security to an electronic device.

FIG. 7 is a flowchart of a procedure 100 which provides security to an electronic device. Step 102 of the procedure 100 involves disposing a microprocessor between a printed circuit board and a circuit element to restrict physical access to the microprocessor. With reference to FIG. 1, the microprocessor 24 has a bottom 50(B) which faces the PCB 22 in the negative Z-direction and a top 50(T) which faces the circuit element (e.g., an electronic display 26) in the positive Z-direction. At this point, access to the microprocessor 24 is extremely difficult without tampering with the electronic device 20 (e.g., by removing the electronic display 26).

In step 104, a power source delivers power to the microprocessor while the microprocessor is disposed between the printed circuit board and the circuit element. As a result, the microprocessor performs particular electronic operations in response to the power (e.g., the microprocessors generates proper OTPs).

In step 106, in response to tampering activity on the circuit element, the microprocessor is electronically prevented from further performing the particular electronic operations. In some arrangements, the microprocessor loses the contents of volatile memory and stops performing operations entirely. In other arrangements, the microprocessor stops performing certain electronic operations (e.g., stops generating normal OTPs) and starts performing non-standard operations (e.g., starts generating OTPs with a hidden alert to the authentication server) which is unnoticeable to users thus making the current holder of the device believe that the tampering activity has gone undetected. Accordingly, the electronic device does not continue to perform the electronic operations to provide effective protection against the tampering activity.

Figure 8:
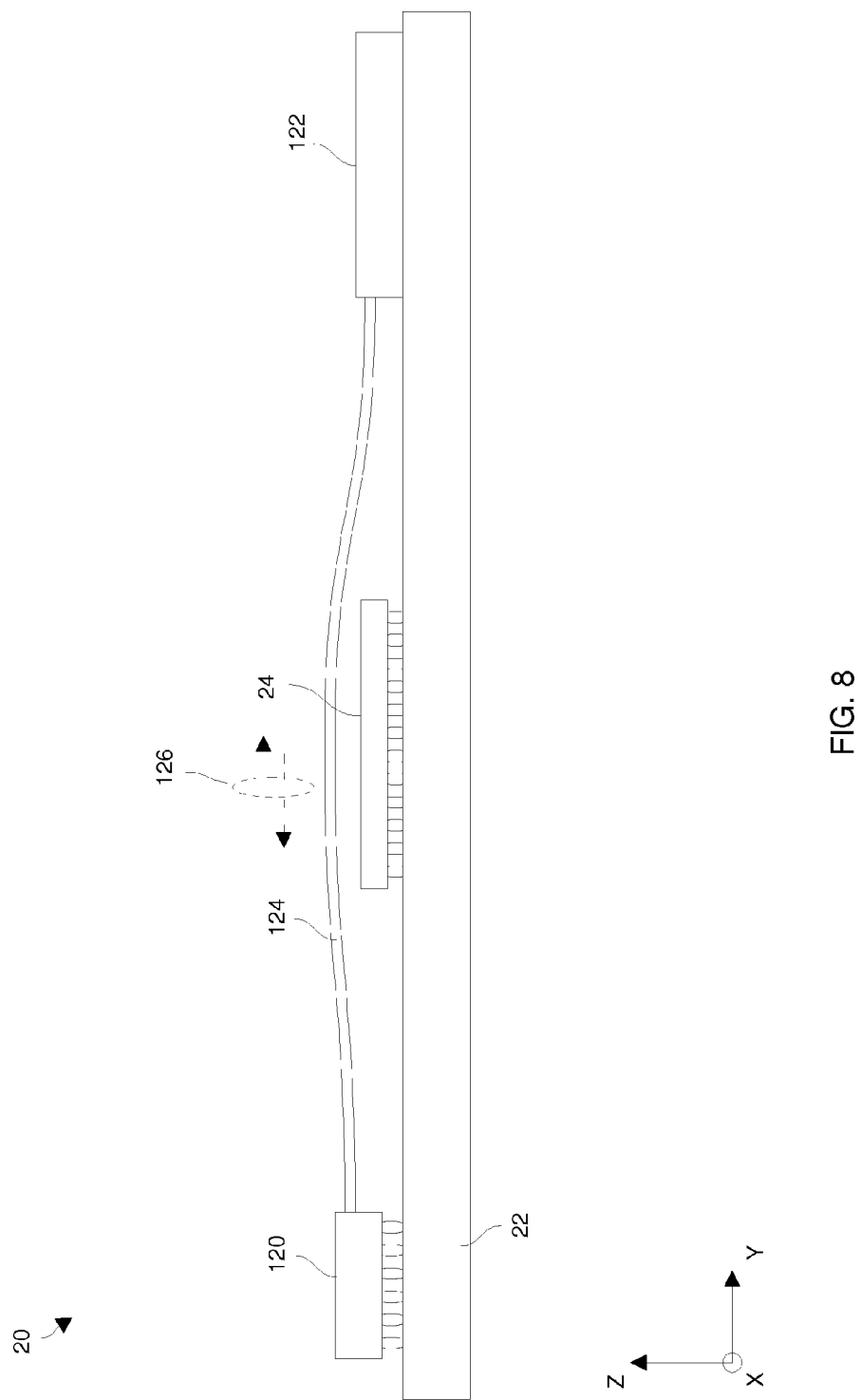
FIG. 8 is a side view of an alternative arrangement for an electronic device which prevents a microprocessor from further performing electronic operations in response to tampering activity on a circuit element.

FIG. 8 shows an alternative arrangement for the electronic device 20. In particular, as shown by the side view of FIG. 8, the electronic device 20 has a connector 120 which is mounted to the PCB 22 on one side of the microprocessor 24 and a display 122 on another side of the microprocessor 24 (i.e., the side opposite the connector 120). The electronic device 20 further includes a ribbon cable 124 which provides conductive paths 126 between the connector 120 and the display 122. In some arrangements, the display 122 is an "electronic paper" type display which is glued to the PCB 22 for mechanical alignment.

The ribbon cable 124 operates in a manner similar to that of the set of pins 42. In particular, the ribbon cable 124 electrically connects the display 122 to the connector 120 and the PCB 22. Additionally, the ribbon cable 124 provides obstruction to the microprocessor 24, i.e., the microprocessors 24 is sandwiched between the PCB 22 and the ribbon cable 24. Alternatively, the ribbon cable 124 may cover other components of the electronic device 20.

It should be understood that a disruption of one or more of the conductive paths 126 is capable of being detected as a tampering activity which stops the microprocessor 24 from further performing the electronic operations. Along these lines, the conductive paths 126 are capable of operating as any of the pins 42 discussed earlier in connection with any of FIGS. 3 through 6. In particular, breaking a critical conductive path 126 provides the same outcome as breaking a critical pin 42.

As mentioned above, improved security techniques involve positioning a microprocessor 24 of an electronic device 20 (e.g., an authentication token) between a PCB 22 and a circuit element (e.g., an electronic display 26), and electronically preventing the microprocessor 24 from further performing electronic operations in response to tampering activity on the circuit element. For example, under normal conditions, the circuit element may provide a particular signal or circuit response which is typically expected by the microprocessor 24. However, if a hacker tampers with the circuit element (e.g., cuts or removes the circuit element) resulting in a change in the signal or response, the microprocessor 24 responds in a secure manner by no longer performing the electronic operations. In some arrangements, the microprocessor 24 stops performing electronic operations altogether. In other arrangements, the microprocessor 24 is prevented from performing standard operations (e.g., electronic operations which authenticate a user under normal conditions), and begins performing specialized operations that covertly signals a receiving device (e.g., an authentication entity) that a tampering activity has occurred.

While various embodiments of the invention have been particularly shown and described, it will be understood by those skilled in the art that various changes in form and details may be made therein without departing from the spirit and scope of the invention as defined by the appended claims.

For example, it should be understood that the electronic display 26 was described by way of example as the particular circuit element which shields the side of the microprocessor 24 which is opposite the PCB 24. Other passive electronic components are suitable for use as well such as an electromagnetic interference shield, a metallic cover, a heat sink, and so on.

Additionally, it should be understood that electronic device 20 was described above as an authentication token by way of example only. Other electronic apparatus are suitable as well such as a smart card, a credit or bank card, an RFID access card, a cell phone, a palm-sized electronic organizer, or any other similar portable and/or handheld computing devices, etc.

Furthermore, it should be understood that some of the connection schemes of FIGS. 3 through 6 can be combined for enhanced tamper activity detection. For example, provided that enough pins 42 of the electronic display 26 are available for use, some pins 42 may purposefully connect to expected high and/or low voltages (FIGS. 3 and 4), other pins 42 may connect to the power source 28 (FIG. 5), and yet other pins may connect in a loop back manner through the electronic display 26 and/or separate conductive member (e.g., the housing) (FIG. 6). Such modifications and enhancements are intended to belong to various embodiments of the invention.

What is claimed is:

1. An electronic device, comprising:
   a printed circuit board;
   a circuit board element;
   a microprocessor disposed between the printed circuit board and the circuit element to restrict physical access to the microprocessor, the microprocessor having (i) a bottom which faces the printed circuit board in a first direction, and (ii) a top which faces the circuit element in a second direction which is opposite the first direction;
   the microprocessor (i) performing electronic operations in response to power from a power source while the microprocessor is disposed between the printed circuit board and the circuit element, and (ii) being electronically prevented from further performing the electronic operations in response to tampering activity on the circuit element;
   wherein the microprocessor is mounted to the printed circuit board;
   wherein the circuit element includes a passive electronic component which covers at least a portion of the microprocessor to inhibit electronic probing of the microprocessor;
   wherein the tampering activity includes a breaking of electrical continuity through a portion of the passive electronic component; and
   wherein the passive electronic component is an electronic display which is (i) mounted to the printed circuit board over the microprocessor and (ii) constructed and arranged to visually output data to a user from the microprocessor while the microprocessor performs the electronic operations.

2. An electronic device as in claim 1 wherein the electronic display includes:
   a display portion which is constructed and arranged to output, as the data, a sequence of one-time passcodes to the user while the microprocessor performs the electronic operations; and
   a set of pins extending from a periphery of the display portion and connecting with the printed circuit board, the set of pins concurrently (i) conveying signals between the printed circuit board and the display portion, and (ii) surrounding the microprocessor and supporting the display portion in a fixed position over the microprocessor to substantially conceal the microprocessor.

3. An electronic device as in claim 2 wherein the set of pins of the electronic display includes a particular lead; and
   wherein the microprocessor is constructed and arranged to (i) perform the electronic operations when the particular lead provides a voltage which exceeds a predetermined voltage threshold, and (ii) no longer perform the electronic operations when the particular lead provides a voltage which is less than the predetermined voltage threshold.

4. An electronic device as in claim 2 wherein the set of pins of the electronic display includes a particular lead; and
   wherein the microprocessor is constructed and arranged to (i) perform the electronic operations when the particular lead provides a voltage which is less than a predetermined voltage threshold, and (ii) no longer perform the electronic operations when the particular lead provides a voltage which exceeds the predetermined voltage threshold.

5. An electronic device as in claim 2 wherein the set of pins of the electronic display includes a pair of power signal leads; and
  wherein the microprocessor is constructed and arranged to (i) perform the electronic operations when the microprocessor receives power from the power source through the pair of power signal leads, and (ii) no longer perform the electronic operations when the microprocessor no longer receives power from the power source through the pair of power signal leads.

6. An electronic device as in claim 2 wherein the set of pins of the electronic display includes a first lead and a second lead, the first and second leads being coupled together by a signal pathway within the electronic display; and
  wherein the microprocessor is constructed and arranged to (i) perform the electronic operations when the microprocessor outputs a microprocessor signal on the first lead and successfully receives the microprocessor signal on the second lead, and (ii) no longer perform the electronic operations when the microprocessor outputs the microprocessor signal on the first lead and fails to receive the microprocessor signal on the second lead.

7. An electronic device as in claim 1 wherein the microprocessor includes an interface section; and
  wherein the electronic display substantially conceals the interface section of the microprocessor when the microprocessor is disposed between the printed circuit board and the circuit element.

8. An electronic device as in claim 1 wherein the microprocessor is constructed and arranged to deactivate in response to the tampering activity.

9. An electronic device as in claim 8 wherein the microprocessor includes volatile memory which initially stores cryptographic information;
  wherein the microprocessor, when performing the electronic operations, is constructed and arranged to cryptographically generate the data which is visually outputted to the user based on the cryptographic information initially stored in the volatile memory; and
  wherein the microprocessor, when being electronically prevented from further performing the electronic operations in response to the tampering activity, is constructed and arranged to switch off the volatile memory to prevent reading of the cryptographic information.

10. An electronic device as in claim 8 wherein the microprocessor includes nonvolatile memory which initially stores cryptographic information;
  wherein the microprocessor, when performing the electronic operations, is constructed and arranged to cryptographically generate the data which is visually outputted to the user based on the cryptographic information initially stored in the nonvolatile memory; and
  wherein the microprocessor, when being electronically prevented from further performing the electronic operations in response to the tampering activity, is constructed and arranged to erase the cryptographic information which is initially stored in the nonvolatile memory.

11. An electronic device as in claim 8 wherein the electronic device is an authentication token having an external housing; and
  wherein at least a portion of the circuit element includes metallic conductive material supported by a portion of the external housing.

12. An electronic device as in claim 1 wherein the microprocessor is constructed and arranged to visually output a series of passcodes exhibiting (i) a first behavior when the microprocessor performs the electronic operations in response to power from the power source while the microprocessor is disposed between the printed circuit board and the circuit element, and (ii) a second behavior when the microprocessor is electronically prevented from further performing the electronic operations in response to the tampering activity.

13. An electronic device as in claim 12 wherein the series of passcodes includes:
  a stream of one-time passcodes, a transition between the first behavior and the second behavior which is exhibited by the series of passcodes being visually unidentifiable by the user.

14. An electronic device as in claim 12 wherein the series of passcodes further includes:
  a status identifier which is selected from a plurality of status identifiers, each status identifier identifying an operating condition of the electronic device.

15. A method of providing security to an electronic device, the method comprising:
  disposing a microprocessor between a printed circuit board and a circuit element to restrict physical access to the microprocessor, the microprocessor having (i) a bottom which faces the printed circuit board in a first direction and (ii) a top which faces the circuit element in a second direction which is opposite the first direction;
  delivering power to the microprocessor from a power source while the microprocessor is disposed between the printed circuit board and the circuit element, the microprocessor performing electronic operations in response to the power delivered from the power source; and
  in response to tampering activity on the circuit element, electronically preventing the microprocessor from further performing the electronic operations;
  wherein the microprocessor is mounted to the printed circuit board;
  wherein the circuit element is an electronic display which is mounted to the printed circuit board over the microprocessor;
  wherein the method further comprises visually outputting data to a user from the microprocessor through the electronic display while the microprocessor performs the electronic operations; and
  wherein the tampering activity includes a breaking of electrical continuity through a portion of the electronic display.

16. A method as in claim 15 wherein visually outputting the data to the user from the microprocessor through the electronic display includes:
  visually outputting a series of passcodes exhibiting (i) a first behavior when the microprocessor performs the electronic operations in response to power from the power source while the microprocessor is disposed between the printed circuit board and the circuit element, and (ii) a second behavior when the microprocessor is electronically prevented from further performing the electronic operations in response to the tampering activity.

17. A method as in claim 16 wherein visually outputting the series of passcodes includes:
  providing a stream of one-time passcodes, a transition between the first behavior and the second behavior exhibited by the series of passcodes being visually unidentifiable by the user.

18. An electronic device as in claim 1 wherein the microprocessor includes (i) an integrated circuit (IC) package which is solder mounted to the printed circuit board, and (ii)

processing circuitry disposed within the IC package to perform the electronic operations; and wherein the electronic display is external to the IC package of the microprocessor, the electronic display having (i) an underside which faces the IC package of the microprocessor and a display side which faces away from the IC package of the microprocessor to electronically output viewable information generated by the microprocessor to a user of the electronic device.

19. A method as in claim 15 wherein disposing the microprocessor between the printed circuit board and the circuit element to restrict physical access to the microprocessor includes:

solder mounting (i) an integrated circuit (IC) package of the microprocessor to the printed circuit board, and (ii) the circuit board element to the printed circuit board to conceal the IC package processing circuitry disposed within the IC package to perform electronic operations; and wherein the electronic display is external to the IC package of the microprocessor, the electronic display having (i) an underside which faces the IC package of the microprocessor and a display side which faces away from the IC package of the microprocessor to electronically output viewable information generated by the microprocessor to a user of the electronic device.

* * * * *